(12) United States Patent
Auvray et al.

(10) Patent No.: US 8,322,391 B2
(45) Date of Patent: Dec. 4, 2012

(54) FLAT RUNNING DEVICE FOR AUTOMOBILE AND MOUNTED ASSEMBLY INCLUDING SAME

(75) Inventors: Stéphane Auvray, Lamorlaye (FR); Stéphane Mouton, Chambly (FR)

(73) Assignee: Hutchinson, Paris (FR)

( * ) Notice: Subject to any disclaimer, the term of this patent is extended or adjusted under 35 U.S.C. 154(b) by 475 days.

(21) Appl. No.: 12/532,515

(22) PCT Filed: Mar. 19, 2008

(86) PCT No.: PCT/FR2008/000360
§ 371 (c)(1),
(2), (4) Date: Oct. 13, 2009

(87) PCT Pub. No.: WO2008/132348
PCT Pub. Date: Nov. 6, 2008

(65) Prior Publication Data
US 2010/0117441 A1  May 13, 2010

(30) Foreign Application Priority Data
Mar. 23, 2007 (FR) ...................................... 07 02125

(51) Int. Cl.
*B60C 17/00* (2006.01)
*B60C 17/04* (2006.01)
(52) U.S. Cl. .......................... 152/516; 152/152; 152/520
(58) Field of Classification Search ........................ None
See application file for complete search history.

(56) References Cited

U.S. PATENT DOCUMENTS

| 3,485,283 | A | * | 12/1969 | Pomeroy et al. | ............. | 152/158 |
| 4,334,565 | A | | 6/1982 | Stokes | | |
| 4,592,403 | A | * | 6/1986 | Stein et al. | ..................... | 152/158 |
| 4,681,147 | A | * | 7/1987 | Hugele | ......................... | 152/158 |
| 7,789,116 | B2 | * | 9/2010 | Campbell et al. | ............. | 152/152 |

FOREIGN PATENT DOCUMENTS

EP  0 104 977 A1  4/1984
(Continued)

OTHER PUBLICATIONS

International Search Report and Written Opinion from International Patent Application No. PCT/FR2008/000360, filed Mar. 19, 2008.

*Primary Examiner* — Justin Fischer
(74) *Attorney, Agent, or Firm* — Alston & Bird LLP (57) ABSTRACT

The invention relates to a flat running device to be fitted on a tubeless mounted assembly for an automobile, and to such a mounted assembly including said device. The flat running device (30) of the invention comprises: an annular bearing structure (31) comprising a ring having a radially outside bearing face (31*a*) for bearing a flat-running tire cover (20), and at least one tightening belt (32) surrounding the ring so as to maintain the same substantially in contact with a running rim (10), at least one radial reinforcement (31*b*) being formed in the bearing face, the tightening belt(s) being applied on said reinforcement and being recessed relative to the bearing face. According to the invention, the bearing structure includes a means (33) for locking it in this hollow (11) by mounting the same so as to bear against a side wall (11*b*) of the hollow, a radially inner face (31*c*) of the locking means being adapted so as to conform to the axial profile of the bottom (11*a*) of said hollow.

20 Claims, 6 Drawing Sheets

FOREIGN PATENT DOCUMENTS

| | | | |
|---|---|---|---|
| EP | 0 159 274 A2 | | 10/1985 |
| EP | 297984 | * | 1/1989 |
| FR | 2 383 031 A | | 10/1978 |
| FR | 2 776 963 A | | 10/1999 |
| GB | 1596215 | * | 8/1981 |
| JP | 63-255106 | * | 10/1988 |
| JP | 2004-237792 | * | 8/2004 |
| JP | 2006-282157 | * | 10/2006 |

* cited by examiner

FLAT RUNNING DEVICE FOR AUTOMOBILE AND MOUNTED ASSEMBLY INCLUDING SAME

CROSS REFERENCE TO RELATED APPLICATIONS

This application is a national stage application filed under 35 U.S.C. 371 of International Application No. PCT/FR2008/000360, filed Mar. 19, 2008, which claims priority from French application Ser. No. 07/02125, filed Mar. 23, 2007.

FIELD AND BACKGROUND OF THE INVENTION

The present invention relates to a run-flat device intended to be fitted to a tubeless mounted assembly for a motor vehicle and such a mounted assembly incorporating this device, allowing a significant distance to be covered at a relatively high speed when the mounted assembly is partially or fully deflated.

For a one-piece rim, the known run-flat devices generally consist of a rigid support ring which is mounted tightly around a wheel rim inside a tire cover. This ring is, for example, formed either as a single piece with relatively flexible side walls that may be continuous or alternatively or an open (i.e. split, from which a slice has been removed) flexible piece, or from at least two rigid pieces in the form of arcs of a circle or sectors.

Document WO-A-79/00612 discloses a run-flat device for a one-piece rim with a circumferential rim well, of which the ring is formed of several sectors each produced in two parts which are axially juxtaposed straddling this rim well, and which are hinged together to allow a bead of the tire cover to be brought into the rim well at the time of assembly. Each of these two parts is provided with a reinforced rubber clamping belt which is designed to keep them axially and radially in contact with the rim.

Document EP-A-104 977 discloses a run-flat device for a wheel rim with several blocks accepting a tire cover, which comprises a ring that supports the tire cover under run-flat conditions and an annular clamping belt circumferentially clamping the ring and applied to a circumferential radial indentation of the support face of the ring.

One major disadvantage with the known run-flat devices for one-piece rims lies notably in the rigidity of the ring used, which allows only a relative absorption of shocks under run-flat conditions.

Another disadvantage with these known devices for one-piece rims lies in the need to use as many rings as there are different rim well profiles capable of accommodating them.

SUMMARY OF THE INVENTION

It is an object of the present invention to propose a run-flat device intended to be fitted to a tubeless mounted assembly for a motor vehicle which comprises a wheel rim and a tire cover mounted on the rim, the device being intended to support the cover following a drop in inflation pressure inside the mounted assembly, which device is able to remedy the aforementioned disadvantages notably by optimizing the radial wedging of said ring on the rim during running in the inflated state (i.e. by limiting the phenomenon whereby the ring is "spun out" by a centrifugal effect) and by allowing this device to be fitted satisfactorily to various types and geometries of one-piece rim.

This device according to the invention comprises:
an annular support structure which comprises a ring that has a radially external support face intended to support the cover under run-flat conditions, and
at least one annular clamping belt circumferentially clamping the ring in such a way as to keep it substantially in contact with the rim during running,
at least one radial indentation being formed circumferentially in said support face, said or each clamping belt being applied to this indentation while being radially set back from said support face.

To this end, a run-flat device according to the invention is such that said support structure comprises means for wedging it in said rim well while mounting it bearing against at least one side wall of said well, a radially internal face of these wedging means being designed to espouse the axial profile of a bottom of said well.

It will be noted that these wedging means allow one single same ring to be used for one-piece flanges with different rim well profiles, notably for different respective well slopes.

It will also be noted that this mounting of the or each clamping belt set back from the support face of the ring notably allows this ring to be held on the rim effectively opposing the phenomenon whereby the ring is "spun out" during running in the inflated state, while at the same time protecting the or each belt by ensuring that it does not interfere with the tire cover under run-flat conditions.

These means of wedging the ring on the rim may advantageously, according to a first embodiment of the invention, form an integral part of said ring, which then forms said structure which is a one piece structure, for example consisting of a circumferential lip which projects axially from at least one lateral face of the ring and which is incorporated therein.

According to a second embodiment of the invention, these means of wedging the ring on the rim may comprise a plurality of axial tabs spaced in the circumferential direction, (advantageously made of plastic material) which are fixed to said ring, for example by clipping or bonding, each wedging tab having, on one of its sides, an axial protrusion intended to press against said side wall of said rim well.

According to a first example of this second embodiment, said wedging tabs are attached under said ring, it being possible for these to be fixed to said radially internal face of the ring, projecting radially toward the inside from this face or, as an alternative, to be housed in axial recesses (such as slots or slits made over a sufficient radial height to fully contain these tabs) formed in said ring, being confined inside the latter.

It will be noted that these axial wedging tabs may make it possible to offset the ring with respect to the rim well, positioning this ring in a way that is axially offset with respect to one of the lateral walls of said well.

According to a second example of this second embodiment said wedging tabs are each substantially in the shape of an inverted T, the axial base of which extends under said ring and is intended to espouse the bottom of said rim well, projecting axially from said side via said protrusion, and of which the radial leg lies flush with said radial indentation which is in part formed by these tabs.

According to a third embodiment of the invention, said wedging means comprise an annular sole of which the radially internal face is intended to espouse the bottom of said rim well and which on one of its sides has a circumferential axial protrusion intended to bear against said lateral wall of said rim well and which is surmounted by said ring.

It will be noted that this sole may be surmounted by said ring without being secured thereto (i.e. by being mounted independently of the ring), or alternatively is secured thereto.

According to a first example of this third embodiment, said sole is formed as a single piece, preferably split.

According to a second example of this third embodiment, said sole is formed of a plurality of sole sectors shaped as arcs of a circle, which are juxtaposed next to one another in the circumferential direction.

According to another feature of the invention, said or at least one of said indentation(s) is advantageously formed of a circumferential groove for the ring.

It will be noted that it might also be possible to imagine forming the or each radial indentation on the support face of the ring using a lateral shoulder giving this indentation a lateral edge defined by one of the two lateral faces of the ring.

Advantageously, said ring may be made of an elastomer or thermoplastic elastomer material so as to absorb shocks when running, both in the inflated state and when flat, and said wedging means are made of a plastic material.

In this case, said ring may be formed as a single piece of the closed type, and may then advantageously comprise at least one region that is narrowed at least in the radial direction by comparison with the rest of the ring so as to increase the deformability of said ring when it is being inserted into the mounted assembly. As an alternative, this closed ring could not have this or these narrowed region(s) but, through the material of which it is made, be elastically deformable enough to facilitate the aforementioned insertion.

It will be noted that such an elastomer ring is advantageously a compact (i.e. non-cellular or alveolar) type, and that it may, for example, be based on natural rubber (NR) or a thermoplastic elastomer.

It will also be noted that, in the abovementioned case in which the ring comprises one or more regions that are narrowed at least radially, these narrowings may be formed both in the radial direction of the height of the ring and in the axial direction of the width thereof. These narrowed regions thus, through an elastic effect, make it easier to insert the run-flat device over a rim flange and inside the tire cover through the bending and/or twisting of the ring in the manner of articulations formed by these regions, and/or by the stretching of this ring to allow it to pass over the rim flange.

According to an alternative form of the invention, said ring may be made of a thermoplastic material, for example based on a polyamide.

Whether it is made of an elastomer material or a plastic material, said ring of the device according to the invention may be formed as a single piece being of the open type, the opening being in the form of two circumferential ends positioned facing one another, or alternatively of the type that is split into several independent (i.e. which are not connected to one another) sectors shaped as arcs of a circle, circumferentially juxtaposed. In both instances, said ring may then advantageously be provided with an annular elastic tie on the bottom of said or of each indentation, this elastic tie being intended to keep said ring in said rim well and being surmounted by said clamping belt.

It is essential to note that the support structure according to the invention, of the type having a support ring and means of wedging in the rim well has, on the one hand, enough flexibility that it can be mounted on the one-piece rim passing over gutters or flanges, after having been inserted inside the cover of the tire and, on the other hand, enough rigidity that it can be held correctly in place in the bottom of the rim well when mounted.

According to another feature of the invention, said or each clamping belt is advantageously of metal type, with adjustable clamping and able to be locked by mechanical means, for example using a bolt clamp. As an alternative said or each clamping belt maybe of the closed strap type made of fabric with an adjustable diameter, for example.

This metallic belt needs to be flexible enough that it can be inserted easily into the cover of the tire and substantially non-deformable with respect to the forces transmitted during running once the belt has been locked, so that it effectively opposes the aforementioned "spin out" effect.

It will also be noted that the mechanism for tightening the or each belt may be employed either in the plane of the wheel or, more advantageously, along an axis perpendicular to this plane (which is less restrictive for mounting).

For preference the ring has, when viewed in axial section, a more or less U shape, of which the base is mounted in said rim well and which defines said groove-like indentation that accommodates said clamping belt.

A tubeless mounted assembly for a motor vehicle according to the invention, comprising a wheel rim, a tire cover mounted against the axially internal and external flanges of said rim and a run-flat device mounted on said rim and intended to support said cover following a drop in inflation pressure inside said mounted assembly, is characterized in that said device is as defined hereinabove.

Advantageously, this mounted assembly is such that said wedging means which define said radially internal face of said support structure are mounted on this rim well across the entire axial width thereof, such that this structure is axially distant from said rim flanges, said or each clamping belt being of the metallic type with adjustable clamping and able to be locked by mechanical means.

This run-flat device notably has the following advantages, by comparison with existing run-flat devices for one-piece rims:

the devices according to the invention with axial tabs or wedging sole allow one and the same ring to be positioned simply (and therefore inexpensively) on a multitude of rims, by fixing these tabs or this sole to, or incorporating them/it into, the ring, and in the aforementioned preferred case in which the ring is made of an elastomer material, the corresponding device allows shocks to be absorbed satisfactorily, unlike most devices which are of the rigid ring type, the device is relatively simple to mount on the rim, advantageously having one single clamping point.

In the present description, the expressions "axially internal" and "axially external" refer respectively to those sides of the wheel rim that are intended to face toward the interior and toward the exterior of the motor vehicle, and the expressions "radially internal" and "radially external" refer respectively to radial directions with respect to the rim which are closer to and further from the latter.

BRIEF DESCRIPTION OF THE DRAWINGS

Other features, advantages and details of the present invention will emerge from reading the following description of a number of embodiments of the invention, which are given by way of nonlimiting illustration, said description being given with reference to the attached drawings, among which.

MORE DETAILED DESCRIPTION

Figure 1:
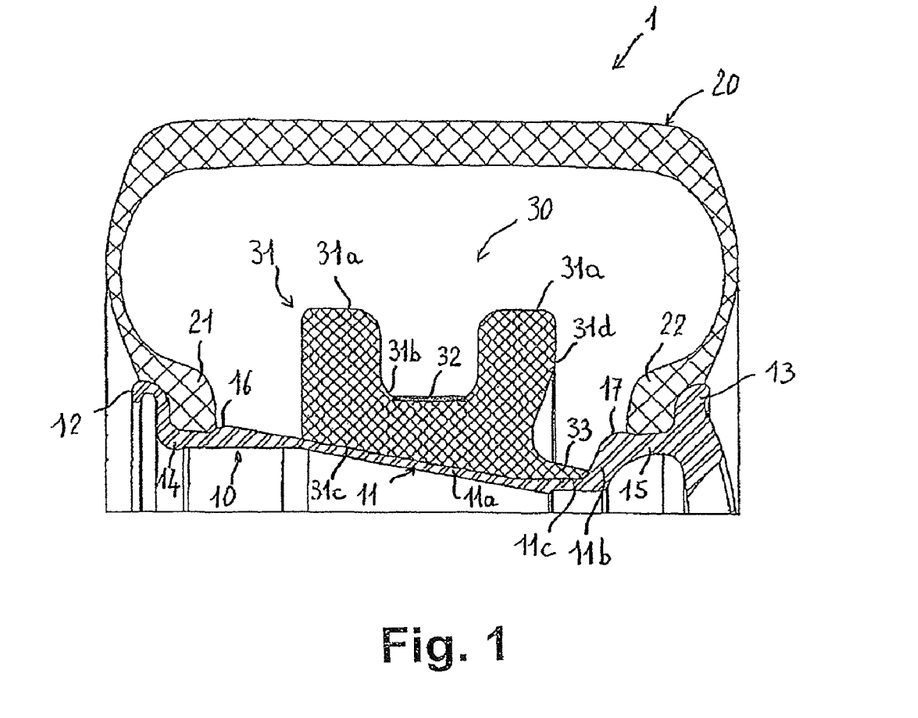
FIG. 1 is a axial half-section of a mounted assembly with one-piece rim of the type having a rim well which incorporates a run-flat device according to a first embodiment of the invention.

The mounted assembly 1 illustrated in FIG. 1 according to the first embodiment of the invention comprises an asymmetric wheel rim 10 of the one-piece type comprising a circumferential rim well 11, a tire cover 20 mounted against axially internal and external flanges 12 and 13 of the rim 10, and a run-flat device 30 mounted in the rim well 11 and intended to support the cover 20 following a drop in inflation pressure inside the mounted assembly 1.

The rim 10 comprises axially internal and external rim seats 14 and 15 intended respectively to accept beads 21, 22 of the cover 20, each rim seat 14, 15 being axially delimited by one of the flanges 12, 13 and, optionally in the example of FIG. 1, by an adjacent circumferential hump 16, 17.

In this exemplary embodiment, the rim well 11 is of the type having an essentially oblique bottom 11a which is slightly inclined axially towards the outside and radially towards the inside and which is delimited axially on the inside by the hump 16 and axially on the outside by an axially external lateral wall 11b which runs axially and above all radially towards the inside from the adjacent hump 17. More specifically, it may be seen in FIG. 1 that the bottom 11a of the rim well 11 ends axially toward the outside in a short substantially horizontal land 11c extended by the wall 11b.

The device 30 is designed to be positioned on the bottom 11a of the well 11 and comprises:
- a one-piece support ring 31 made of elastomer or plastic material, substantially in the shape of a U in this embodiment example and having a radially external support face 31a which is intended to support the cover under run-flat conditions and in which there is formed a circumferential groove 31b defined by the base of U, and
- a metallic annular clamping belt 32 with adjustable clamping and which can be locked for example by means of a bolt clamp (not depicted), which is applied to the groove 31b while being radially set back from the support face 31a (defined in FIG. 1 by the radially external tops of the two arms of the U) and in such a way as to clamp the ring 31 circumferentially so as to keep it in contact with the rim 10 during running.

As illustrated in FIG. 1, the depth of the groove 31b is relatively great by comparison with the mean radial height of the ring 31, being, for example, equal to approximately half of this mean radial height separating the support face 31a from the radially internal face 31c of the ring 31.

This radially internal face 31c is designed to espouse the axial profile of the rim well 11, i.e. in this example, both its oblique main portion 11a and the land 11c. For this purpose, the ring 31 comprises means 33 for wedging it into the rim well 11, these means in this example consisting of a circumferential lip which is formed to project axially on the axially external lateral face 31d of the ring 31 and which forms an integral part of the ring 31. This wedging lip 33 has an axial width of the order of that of the land 11c, being designed to press against the latter and to be in contact with the external lateral wall 11b of the rim well 11.

Figure 2:
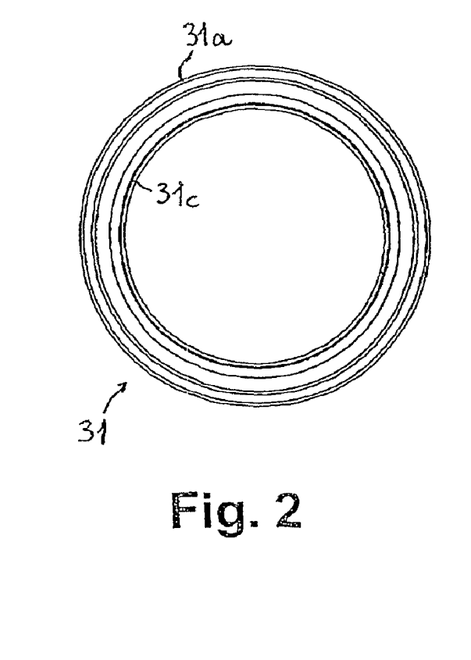
FIG. 2 is a side view of the ring of the device of FIG. 1 in a first example of an embodiment according to the invention.

The ring 31 according to the first example of this first embodiment which is illustrated in FIG. 2 is specifically made of rubber and is formed as a single piece with a closed structure.

Figure 3:
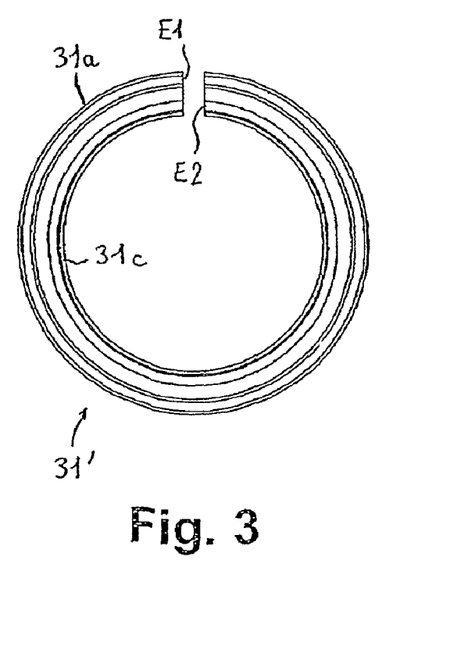
FIG. 3 is a side view of the ring of the device of FIG. 1 in a second example of an embodiment of the invention.

The ring 31' according to the second example of this first embodiment, which is illustrated in FIG. 3, may be made of rubber or equally of plastic. This ring 31' is also formed as a single piece that is open (i.e. split into an axial slice, so as to exhibit two circumferential ends E1 and E2 positioned facing one another). Advantageously, an annular elastic tie (not illustrated) may be positioned on the groove 31b of the ring 31' before the clamping belt is placed therein, in order to keep this ring 31' correctly positioned in the rim well 11 during mounting.

Figure 4:
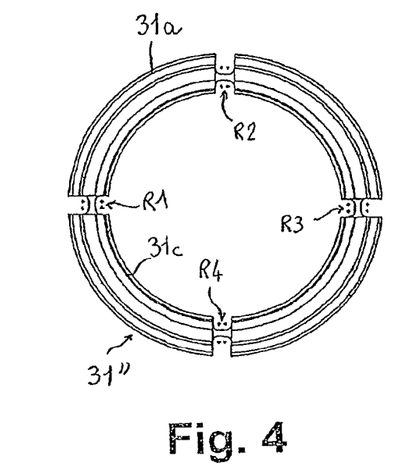
FIG. 4 is a side view of the ring of the device of FIG. 1 in a third example of an embodiment according to the invention.

The ring 31" according to the third example of this first embodiment which is illustrated in FIG. 4 is specifically made of rubber and comprises a plurality of narrowed regions R1, R2, R3 and R4 (at least four of them in this embodiment example), which have a radial height markedly smaller by comparison with that of the rest of the ring 31", so as to increase the deformability of this ring as it is being inserted inside the mounted assembly 1. These narrowed regions R1 to R4—through an elastic effect—make it easier for the device 30 to be inserted over a rim flange 12, 13 and into the cover 12, by the folding and/or twisting of the ring 31" in the manner of articulations formed by these regions R1 to R4.

Figure 5:
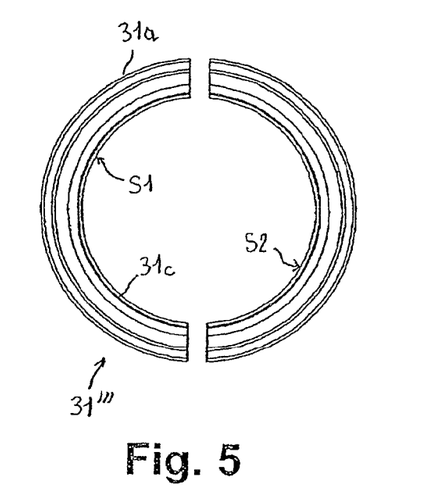
FIG. 5 is a side view of the ring of the device of FIG. 1 in a fourth example of an embodiment according to the invention.

According to the fourth example of this first embodiment which is illustrated in FIG. 5, the ring 31''' may be made of rubber or equally of plastic. This ring 31''' is split into a plurality of sectors S1 and S2 in the form of arcs of a circle (there being two of these in this example) which are circumferentially juxtaposed and are independent (i.e. which are not connected to one another). Advantageously, an annular elastic tie may be positioned on the groove 31b of the ring 31''' before the clamping belt 32 is positioned therein, in order to keep this ring 31''' correctly positioned in the rim well 11 during mounting.

Mounting the run-flat device 30 inside the mounted assembly 1 before the latter is inflated and balanced, essentially involves the following steps:
- inserting the ring 31, 31', 31", 31''', optionally fitted with the belt 32 in the untightened position inside the cover 20,
- slipping a bead 21 of the cover 20 containing the device 30 over the rim 10,
- slipping the ring 31, 31', 31", 31''' equipped with its untightened belt slot 32 onto the rim 10, optionally, if the ring 31, 31', 31", 31'" inserted inside the cover 20 does not have its belt 32, mounting the latter on this ring, clamping the ring 31, 31', 31", 31'" against the rim 10 by tightening the belt 32, for example using the aforementioned bolt clamp, and slipping the second bead 22 of the cover 20 onto the rim 10 to complete the mounting.

Figure 6:
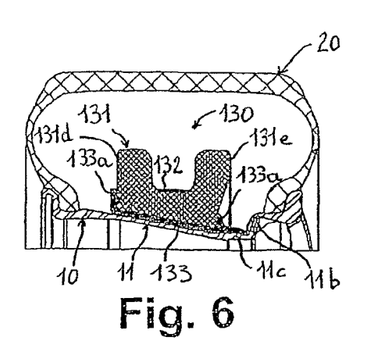
FIG. 6 is an axial half-section of a mounted assembly with one-piece rim with a rim well which incorporates a first example of the invention of a run-flat device according to a second embodiment of the invention.
Figure 8:
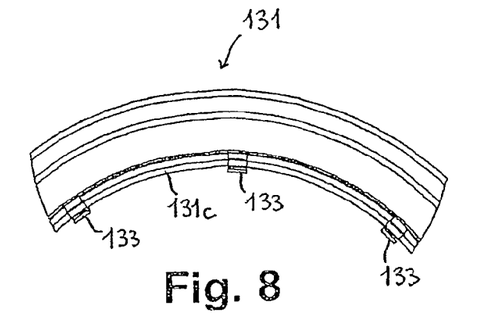

The run-flat device 130 according to the first alternative form of FIG. 1 which is illustrated in FIGS. 6 and 8 differs solely from the aforementioned device 30 in that it comprises rigid axial wedging tabs 133 by way of means of wedging the ring 131 equipped with the belt 132 into the rim well 11 of the rim 10, in place of the wedging lip 33 incorporated in the ring 31. These axial tabs 133, advantageously made of plastic material, are uniformly spaced about the circumference of the ring 131, being attached under the latter, for example by clipping or bonding.

As illustrated in FIG. 6, each tab 133 has, when viewed in axial section, more or less the shape of a recumbent F with the two prongs 133a facing upward and gripping the radially internal part of the two lateral faces 131d and 131e of the ring 131, while the bottom of the leg of the F is applied to the land 11c ending the rim well 11, by bearing against the external lateral wall 11b thereof. As illustrated in FIG. 8, each tab 133 in this case is fixed under the radially internal face 131c of the ring 131 (see FIG. 8), projecting radially toward the inside of this face 131c.

Figure 7:
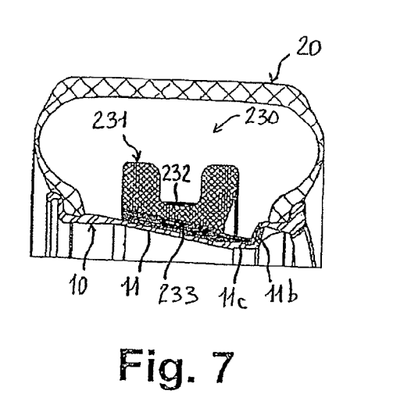
FIG. 7 is an axial half-section of a mounted assembly with one-piece ring which incorporates an alternative form of this first example of the invention of a run-flat device according to this second embodiment, FIGS. 8 and 9 respectively are partial and side views of the rings of the devices according to FIGS. 6 and 7.
Figure 9:
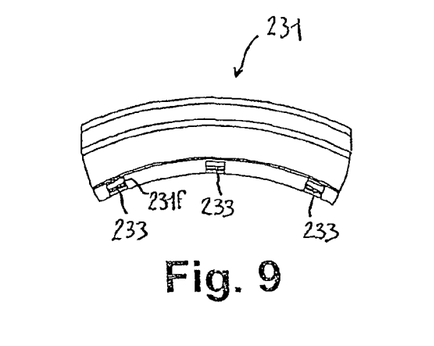

The run-flat device 230 according to the second alternative form of FIG. 1 which is illustrated in FIGS. 7 and 9 differs solely from the device 130 of FIGS. 6 and 8 in that the rigid axial wedging tabs 233 which are attached under the ring 231 equipped with the belt 232 have a substantially straight profile (when viewed in axial section) in the manner of a sole, and are respectively housed in axial slots or slits 231f formed in the groove 231, being confined to the inside thereof (i.e. these tabs 233 are set into the internal volume of the ring 231).

It will be noted that these wedging tabs 133, 233 allow one and the same ring 131, 231 to be used for one-piece rims 10 that have different rim well 11 profiles, and that they are able to offset the ring 131, 231 with respect to the well 11, by positioning it axially offset from the lateral wall lib of the well 11. These wedging tabs 133, 233 thus make it possible, by offsetting the ring 131, 231, to free up enough space for the second bead 22 of the cover 20 to be mounted.

Figure 10:
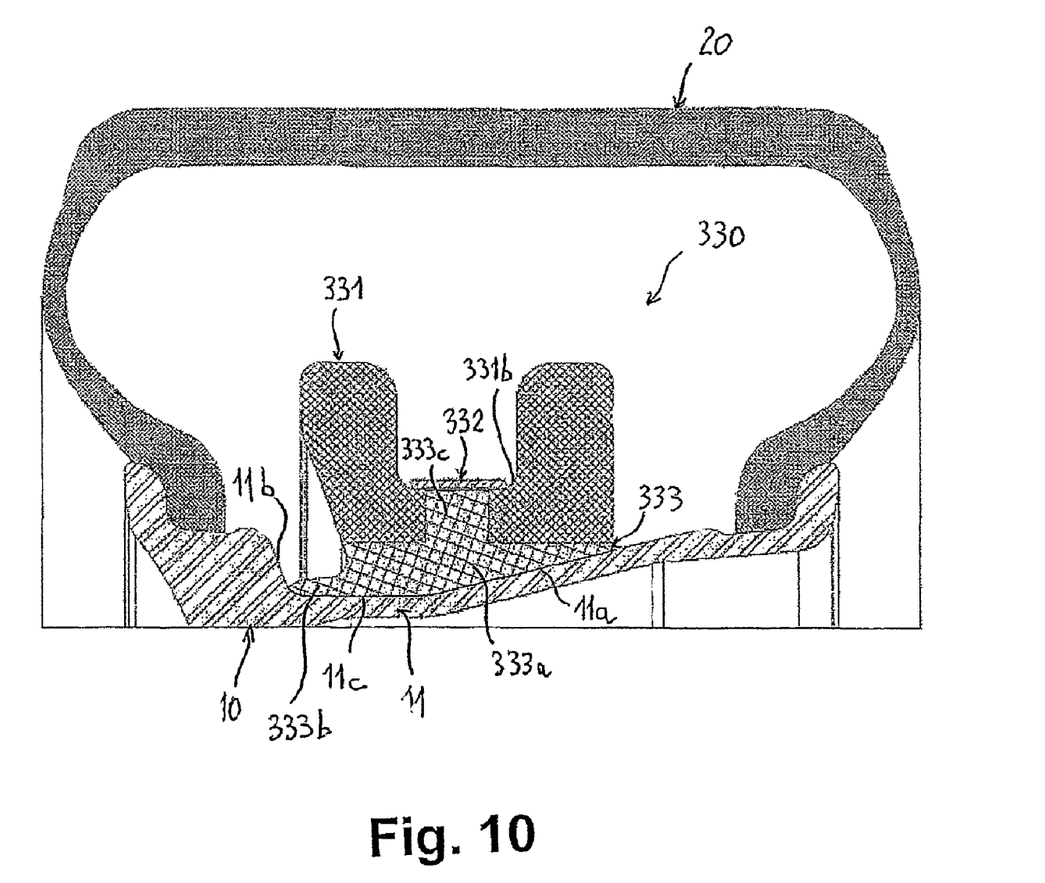
FIG. 10 is an axial half-section of a mounted assembly with a one-piece rim which incorporates a second example of a run-flat device according to this second embodiment.
Figure 11:
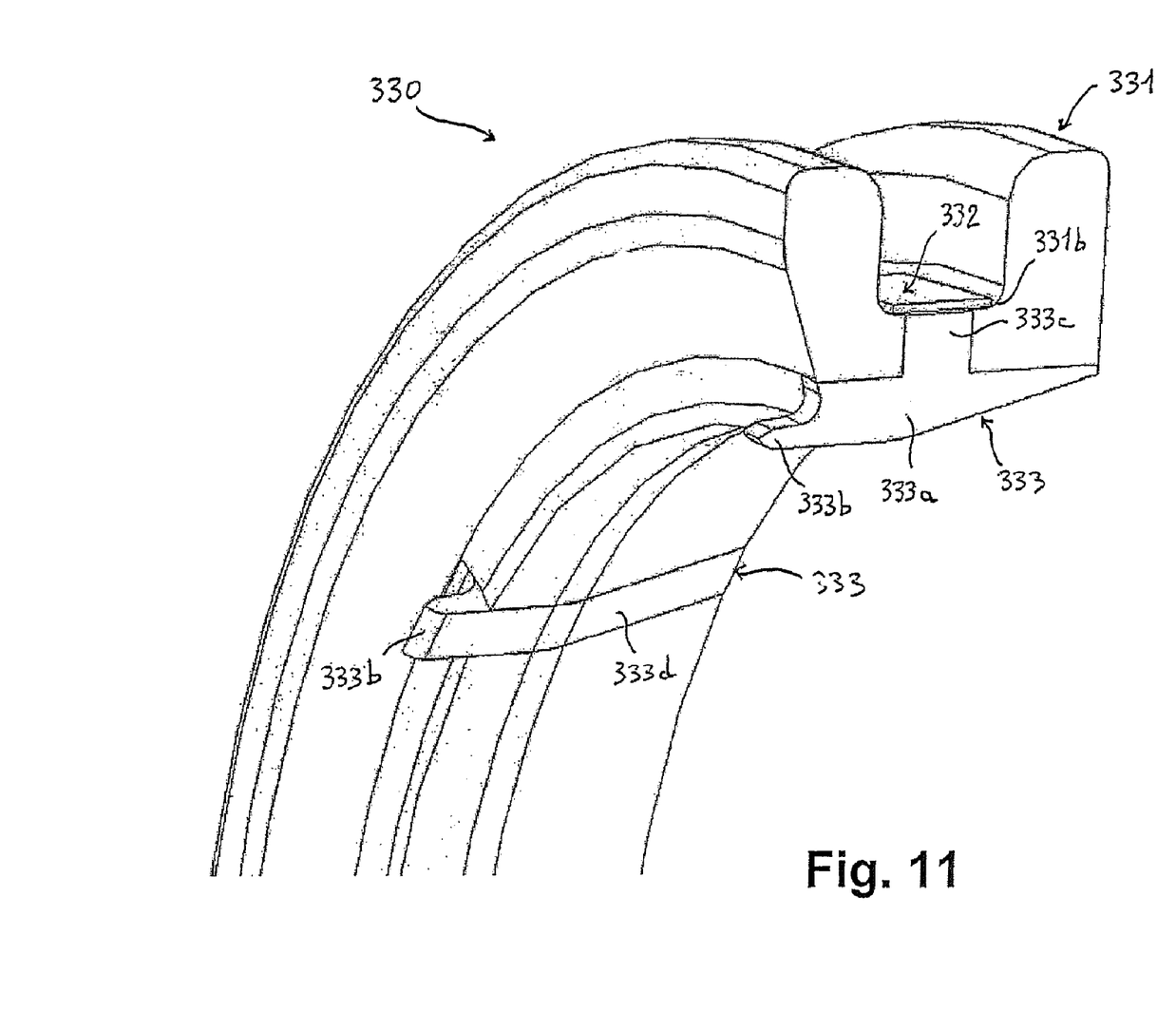
FIG. 11 is a partial perspective view of the run-flat device of FIG. 10.

The run-flat device 330 according to the second example of the second embodiment of the invention which is illustrated in FIGS. 10 and 11 essentially differs from that of FIGS. 7 and 8 in that the axial wedging tabs 333 which are fixed to the ring 331 are mounted so that they pass through the ring 331 not only in its axial direction but also in its radial direction. Specifically, these wedging tabs 333 are each more or less in the shape of inverted T, of which:

the axial base 333a extends under the ring 331, having an underside 333d tailored to the bottom 11a of the rim well 11 to be used, projecting axially from one side thereof in the form of a lip-shaped lateral protrusion 333b intended to bear against the lateral wall lib of the rim well 11, and of which the radial leg 333c lies flush with the central groove 331b of the ring 331.

This groove 331b, which is thus partially formed by these tabs 333, is covered by a clamping belt 332 analogous to the aforementioned belts 32, 132 and 232.

Figure 12:
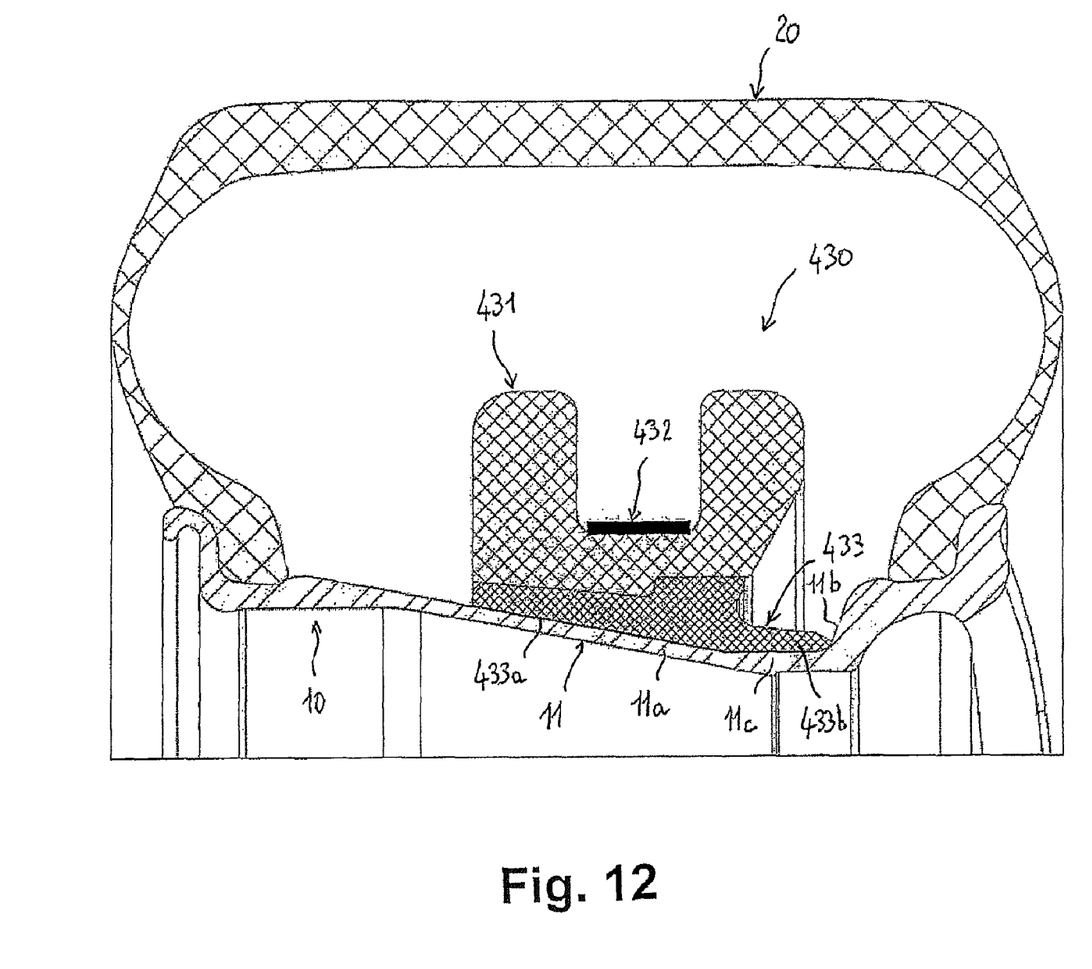
FIG. 12 is an axial half-section of a mounted assembly with one-piece rim which incorporates a run-flat device according to a third embodiment of the invention.
Figure 13:
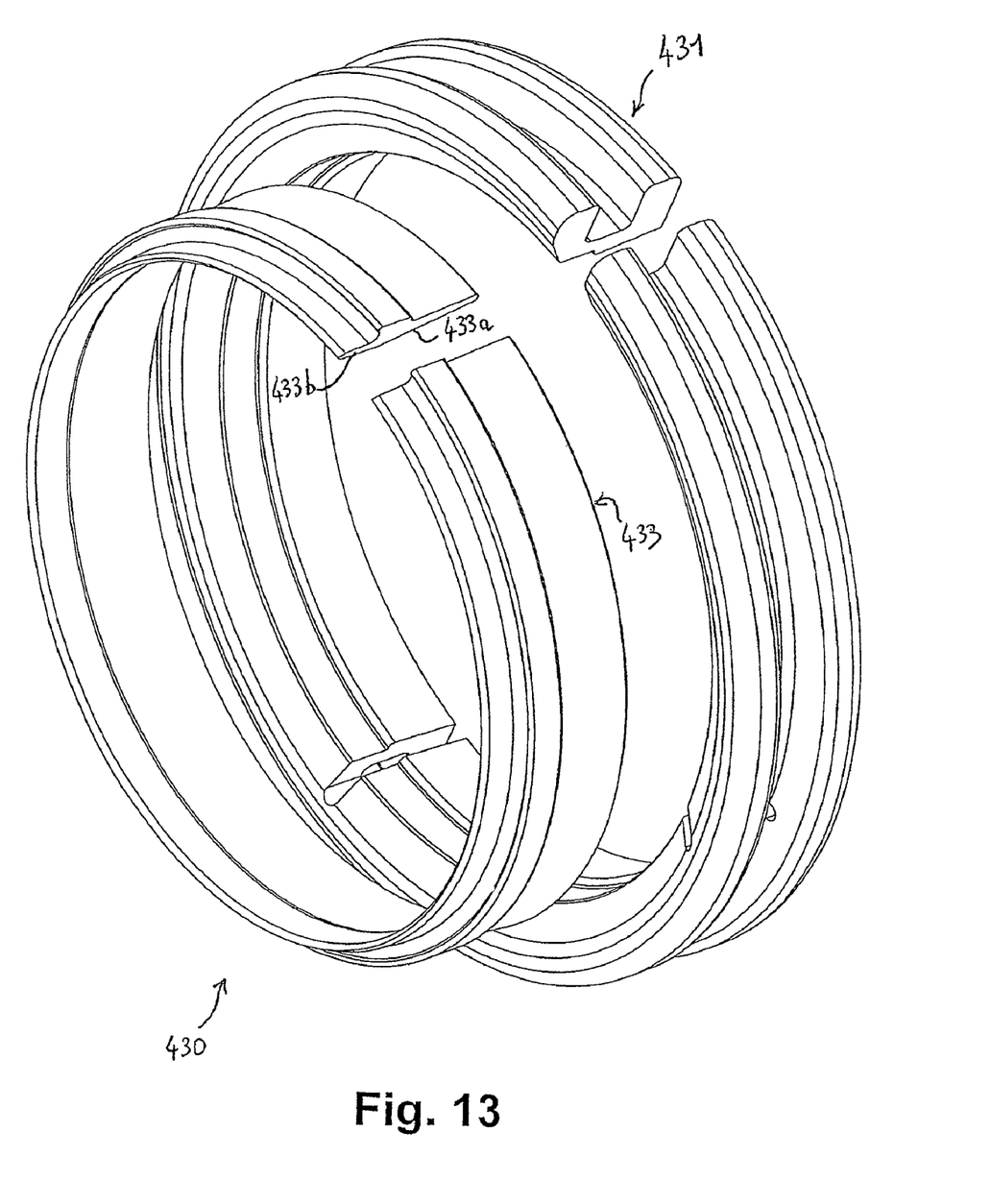
FIG. 13 is an exploded perspective view of the run-flat device of FIG. 12.

The run-flat device 430 according to the third embodiment of the invention which is illustrated in FIGS. 12 and 13 essentially differs from that of FIGS. 10 and 11 in that the axial wedging tabs 333 secured to the ring 331 such that they pass through it have here been replaced by an annular sole 433 positioned under the ring 431. The sole 433 has an underside 433a tailored to the bottom 11a of the rim well 11 that is to be used; on one of its sides it has a circumferential axial protrusion 433b intended to bear against a lateral wall 11b of the well 11 and this sole 433 is surmounted by the ring 431, itself covered with a clamping belt 432.

As can be seen in FIG. 13, the sole 433 according to this example may advantageously be formed as a single piece by being split, it being, for example, made of a relatively rigid plastic material in order correctly to wedge the ring 431 that surmounts it in the rim well 11, and this ring 431 may equally be of a single piece and split, preferably being made of a more flexible material of the elastomer or thermoplastic elastomer type, in order satisfactorily to absorb shocks.

The invention claimed is:

1. A run-flat device for a motor vehicle wheel rim of the one-piece asymmetric type with a circumferential rim well, the device being configured to be wedged in said rim well and to support a tire cover mounted on the rim following a drop in inflation pressure inside the tire, this device comprising:

an annular support structure which comprises a ring that has a radially external support face intended to support the cover under run-flat conditions, and at least one annular clamping belt circumferentially clamping the ring in such a way as to keep it substantially in contact with the rim during running, at least one radial indentation being formed circumferentially in said support face, said or each clamping belt being applied to this indentation and being radially set back from said support face, wherein said support structure comprises wedging means configured for wedging it in said rim well while mounting it bearing against at least one side wall of said well, a radially internal face of these wedging means being configured to espouse the axial profile of a bottom of said well, and wherein said wedging means comprise:

(i) a plurality of axial wedging tabs spaced in the circumferential direction, which are fixed to said ring for example by clipping or bonding, each wedging tab having on one of its sides an axial protrusion intended to press against said side wall of said rim well, or (ii) an annular sole of which the radially internal face is intended to espouse the bottom of said rim well and which on one of its sides has a circumferential axial protrusion intended to bear against said lateral wall of said rim well, said sole being surmounted by said ring without being secured thereto or with being attached thereto.

2. The run-flat device as claimed in claim 1, wherein in alternative (i) said wedging tabs are attached under said ring.

3. The run-flat device as claimed in claim 2, characterized in that the wedging tabs are fixed to said radially internal face of said ring, projecting radially toward the inside from this face.

4. The run-flat device as claimed in claim 2, characterized in that these wedging tabs are housed in axial recesses formed in said ring, being confined inside the latter.

5. The run-flat device as claimed in claim 1, characterized in that in alternative (i) said wedging tabs are each substantially in the shape of an inverted T, the axial base of which extends under said ring and is intended to espouse the bottom of said rim well, while projecting axially from said side via said protrusion, and of which the radial leg lies flush with said radial indentation which is in part formed by these tabs.

6. The device as claimed in claim 1, characterized in that in alternative (ii) said sole is formed as a single piece.

7. The device as claimed in claim 1, characterized in that in alternative (ii) said sole is formed of a plurality of sole sectors shaped as arcs of a circle, which are juxtaposed next to one another in the circumferential direction.

8. The run-flat device as claimed in claim 1, characterized in that said or at least one of said indentation(s) is formed of a circumferential groove for the ring.

9. The run-flat device as claimed in claim 8, characterized in that the ring has, when viewed in axial section, a more or less U shape, of which a base is mounted in said rim well and which defines said groove-like indentation that accommodates said clamping belt.

10. The run-flat device as claimed in claim 1, characterized in that said ring is made of an elastomer or thermoplastic elastomer material so as to absorb shocks when running, said wedging means being made of a plastic material.

11. The run-flat device as claimed in claim 10, characterized in that said ring is formed as a single piece and is of the closed type.

12. The run-flat device as claimed in claim 11, characterized in that the ring comprises at least one region that is narrowed at least in the radial direction by comparison with the rest of the ring so as to increase the deformability of said ring when it is being inserted into the mounted assembly.

13. The run-flat device as claimed in claim 1, characterized in that the ring is made of a thermoplastic material.

14. The run-flat device as claimed in claim 10, characterized in that the ring is formed as a single piece and is of the open type, the opening being in the form of two circumferential ends positioned facing one another.

15. The run-flat device as claimed in claim 10, characterized in that the ring is split into several independent sectors shaped as arcs of a circle, circumferentially juxtaposed.

16. The run-flat device as claimed in claim 13, characterized in that the ring is provided with an annular elastic tie on the bottom of said or of each indentation, this elastic tie being intended to keep said ring in said rim well and being surmounted by said clamping belt.

17. The run-flat device as claimed in claim 1, characterized in that said or each clamping belt is of metal type, with adjustable clamping and able to be locked by mechanical means.

18. The run-flat device as claimed in claim 1, characterized in that said or each clamping belt is of the closed strap type made of fabric.

19. A tubeless mounted assembly for a motor vehicle, comprising an asymmetric wheel rim of the one-piece type with a circumferential rim well, a tire cover mounted against the axially internal and external flanges of said rim and a run-flat device mounted on said rim and intended to support said cover following a drop in inflation pressure inside said mounted assembly, characterized in that said device is configured to be wedged in said rim well and comprises:

an annular support structure which comprises a ring that has a radially external support face intended to support the cover under run-flat conditions, and at least one annular clamping belt circumferentially clamping the ring in such a way as to keep it substantially in contact with the rim during running, at least one radial indentation being formed circumferentially in said support face, said or each clamping belt being applied to this indentation and being radially set back from said support face, wherein said support structure comprises wedging means configured for wedging it in said rim well while mounting it bearing against at least one side wall of said well, a radially internal face of these wedging means being configured to espouse the axial profile of a bottom of said well.

20. The mounted assembly as claimed in claim 19, characterized in that said wedging means which define said radially internal face of said support structure are mounted on this rim well across the entire axial width thereof, such that this structure is axially distant from said rim flanges, said or each clamping belt being of the metallic type with adjustable clamping and able to be locked by mechanical means or alternatively of the closed strap type made of fabric.

* * * * *